US010469511B2

(12) United States Patent
Vasseur et al.

(10) Patent No.: US 10,469,511 B2
(45) Date of Patent: Nov. 5, 2019

(54) USER ASSISTANCE COORDINATION IN ANOMALY DETECTION

(71) Applicant: Cisco Technology, Inc., San Jose, CA (US)

(72) Inventors: Jean-Philippe Vasseur, Anchorage, AK (US); Grégory Mermoud, Veyras (CH); Javier Cruz Mota, Assens (CH); Laurent Sartran, Palaiseau (FR); Sébastien Gay, Les Rousses (FR)

(73) Assignee: Cisco Technology, Inc., San Jose, CA (US)

( * ) Notice: Subject to any disclaimer, the term of this patent is extended or adjusted under 35 U.S.C. 154(b) by 83 days.

(21) Appl. No.: 15/211,093

(22) Filed: Jul. 15, 2016

(65) Prior Publication Data

US 2017/0279834 A1 Sep. 28, 2017

Related U.S. Application Data

(60) Provisional application No. 62/313,981, filed on Mar. 28, 2016.

(51) Int. Cl.

| | |
|---|---|
| ***H04L 29/06*** | (2006.01) |
| ***G06N 5/04*** | (2006.01) |
| ***G06N 20/00*** | (2019.01) |
| ***H04L 12/26*** | (2006.01) |
| ***H04L 12/24*** | (2006.01) |

(52) U.S. Cl.

CPC ......... *H04L 63/1425* (2013.01); *G06N 5/043* (2013.01); *G06N 20/00* (2019.01); *H04L 41/147* (2013.01); *H04L 43/024* (2013.01); *H04L 43/062* (2013.01); *H04L 43/14* (2013.01); *H04L 63/02* (2013.01); *H04L 63/145* (2013.01); *H04L 63/1458* (2013.01); *H04L 2463/144* (2013.01)

(58) Field of Classification Search

CPC ............. H04L 63/1425; H04L 63/1458; H04L 2463/144; G06N 99/005; G06N 5/043

See application file for complete search history.

(56) References Cited

U.S. PATENT DOCUMENTS

| | | |
|---|---|---|
| 8,045,464 B1 | 10/2011 | Nucci et al. |
| 8,191,139 B2 | 5/2012 | Heimerdinger et al. |
| 8,887,286 B2 | 11/2014 | Dupont et al. |

(Continued)

OTHER PUBLICATIONS

Park et al. "Optimal Stop Points for Data Gathering in Sensor Networks with Mobile Sinks" Wireless Sensor Network, 2012, pp. 1-10.

*Primary Examiner* — Robet B Leung

(74) *Attorney, Agent, or Firm* — Behmke Innovation Group LLC; James Behmke; Stephen D. LeBarron

(57) ABSTRACT

In one embodiment, a device in a network receives feedback regarding an anomaly reporting mechanism used by the device to report network anomalies detected by a plurality of distributed learning agents to a user interface. The device determines an anomaly assessment rate at which a user of the user interface is expected to assess reported anomalies based in part on the feedback. The device receives an anomaly notification regarding a particular anomaly detected by a particular one of the distributed learning agents. The device reports, via the anomaly reporting mechanism, the particular anomaly to the user interface based on the determined anomaly assessment rate.

20 Claims, 11 Drawing Sheets

(56) References Cited

U.S. PATENT DOCUMENTS

| | | | | |
|---|---|---|---|---|
| 9,237,161 | B2 | 1/2016 | Humble et al. | |
| 9,276,948 | B2 | 3/2016 | Hitt et al. | |
| 9,558,346 | B1 * | 1/2017 | Kolman | G06F 21/50 |
| 2010/0031156 | A1 | 2/2010 | Doyle et al. | |
| 2010/0162399 | A1 | 6/2010 | Sheleheda et al. | |
| 2013/0097706 | A1 * | 4/2013 | Titonis | G06F 21/56<br>726/24 |
| 2013/0160119 | A1 * | 6/2013 | Sartin | G06F 21/552<br>726/23 |
| 2014/0013221 | A1 | 1/2014 | Zheng et al. | |
| 2014/0188895 | A1 * | 7/2014 | Wang | G06F 16/335<br>707/748 |
| 2015/0033084 | A1 | 1/2015 | Sasturkar et al. | |
| 2015/0033086 | A1 | 1/2015 | Sasturkar et al. | |
| 2015/0262067 | A1 * | 9/2015 | Sridhara | G06N 5/04<br>706/12 |
| 2016/0021126 | A1 * | 1/2016 | Vasseur | H04L 63/1416<br>726/23 |
| 2016/0088006 | A1 * | 3/2016 | Gupta | H04L 43/08<br>726/23 |
| 2016/0147583 | A1 * | 5/2016 | Ben Simhon | G06F 11/076<br>714/47.3 |

* cited by examiner

USER ASSISTANCE COORDINATION IN ANOMALY DETECTION

RELATED APPLICATION

This application claims priority to U.S. Provisional Application No. 62/313,981, filed on Mar. 28, 2016, entitled USER ASSISTANCE COORDINATION IN ANOMALY DETECTION, by Vasseur, et al., the contents of which are incorporated herein by reference.

TECHNICAL FIELD

The present disclosure relates generally to computer networks, and, more particularly, to user assistance coordination in anomaly detection.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
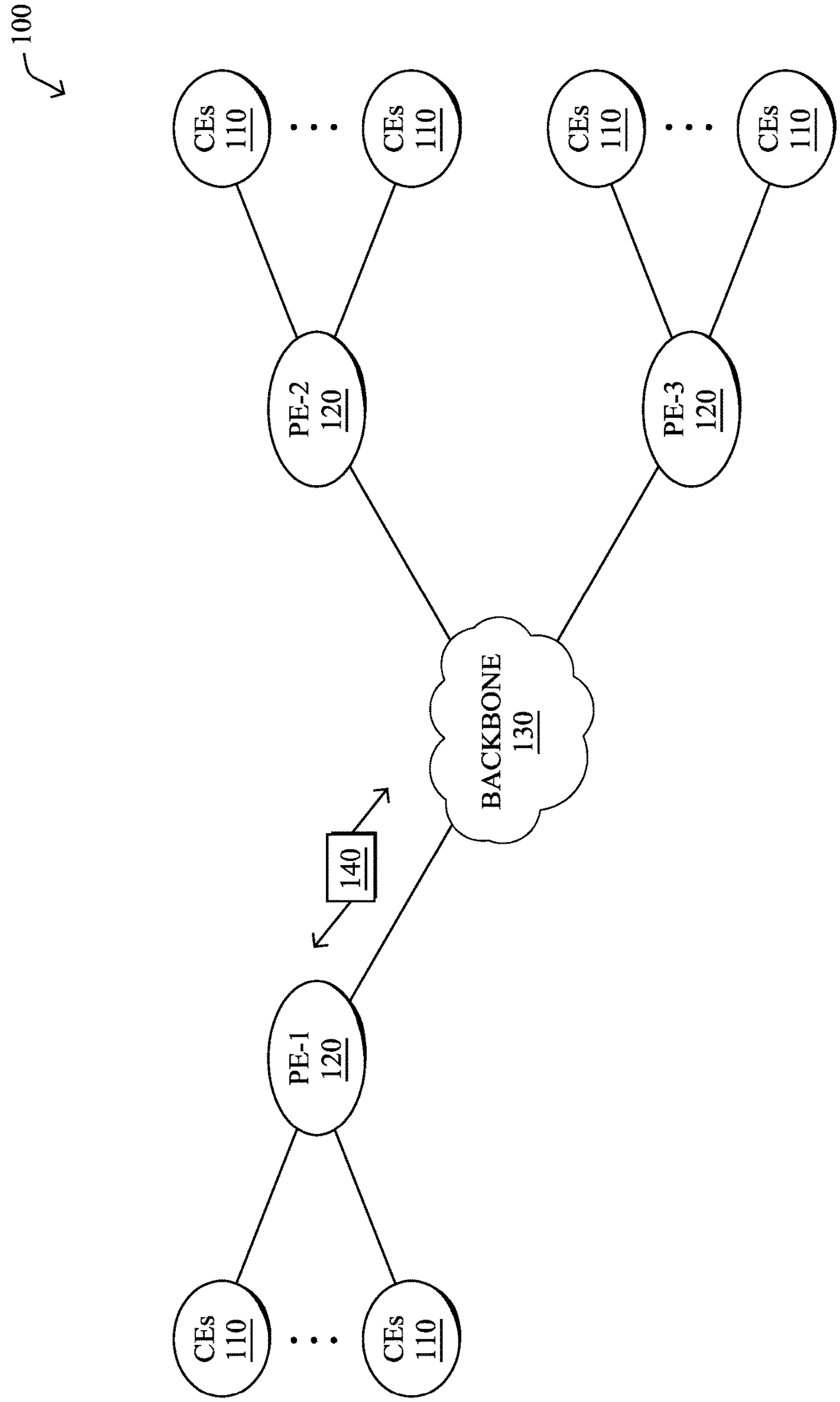
FIGS. 1A-1B illustrate an example communication network.

According to one or more embodiments of the disclosure, a device in a network receives feedback regarding an anomaly reporting mechanism used by the device to report network anomalies detected by a plurality of distributed learning agents to a user interface. The device determines an anomaly assessment rate at which a user of the user interface is expected to assess reported anomalies based in part on the feedback. The device receives an anomaly notification regarding a particular anomaly detected by a particular one of the distributed learning agents. The device reports, via the anomaly reporting mechanism, the particular anomaly to the user interface based on the determined anomaly assessment rate.

In additional embodiments, a device in a network adds, to a training data set, feedback regarding an anomaly reporting mechanism used by the device to report network anomalies detected by a plurality of distributed learning agents to a user interface. The device trains a machine learning-based classifier using the training data set to determine a relevancy for a detected anomaly. The device determines a relevancy for a particular anomaly detected by a particular one of the distributed learning agents. The device reports, via the anomaly reporting mechanism, the particular anomaly to the user interface based in part on the determined relevancy.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
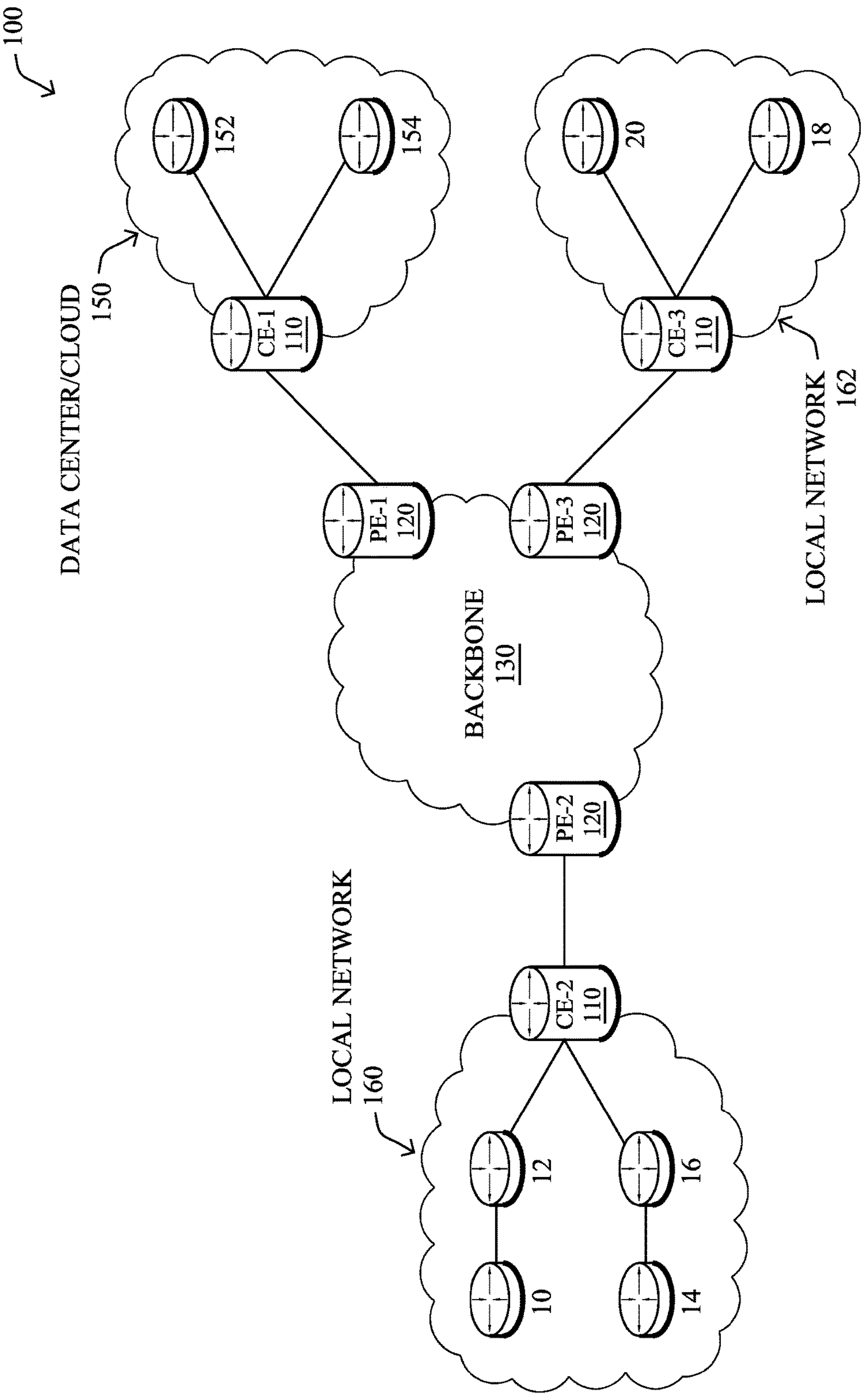

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
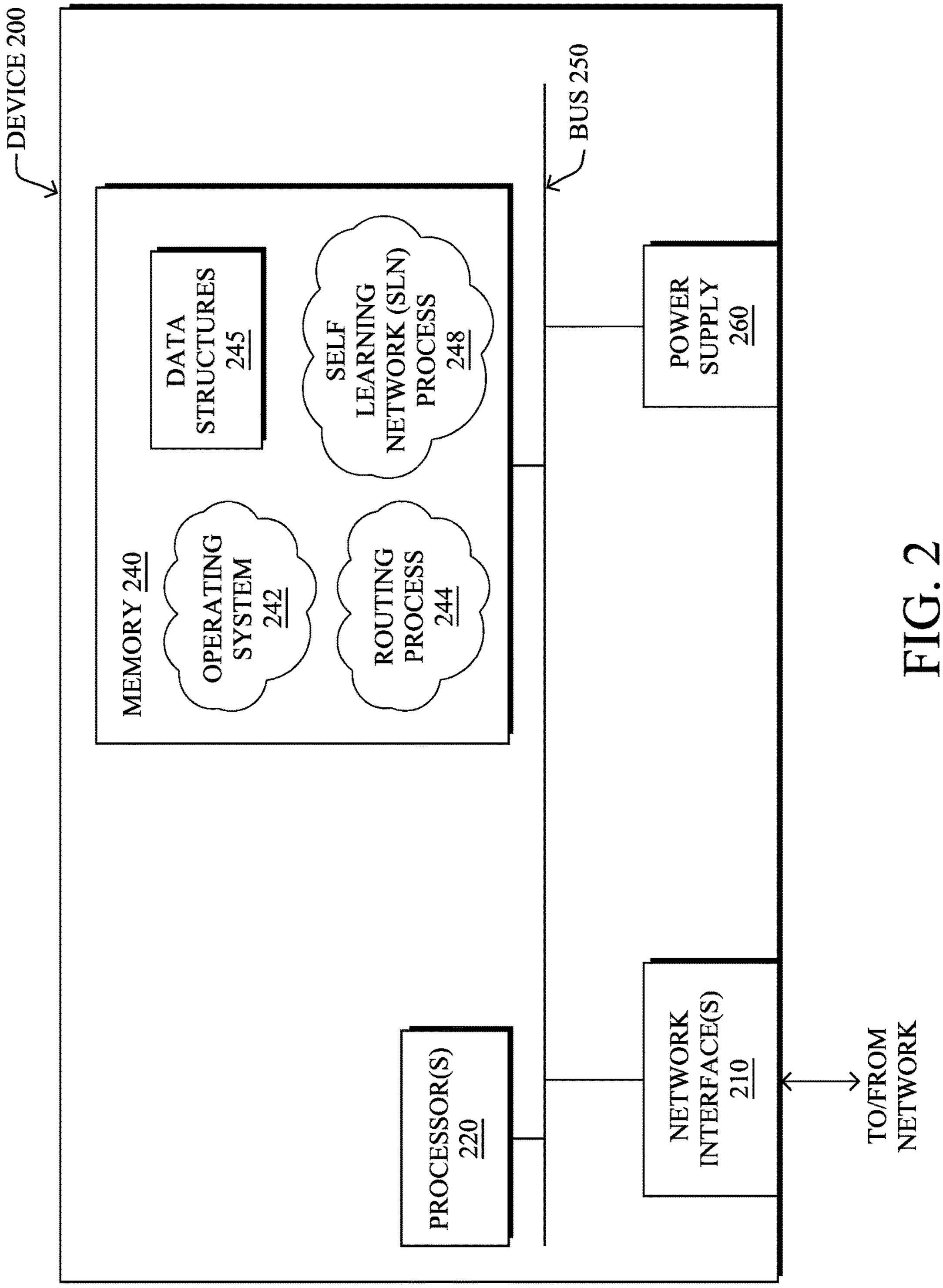
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space.

Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
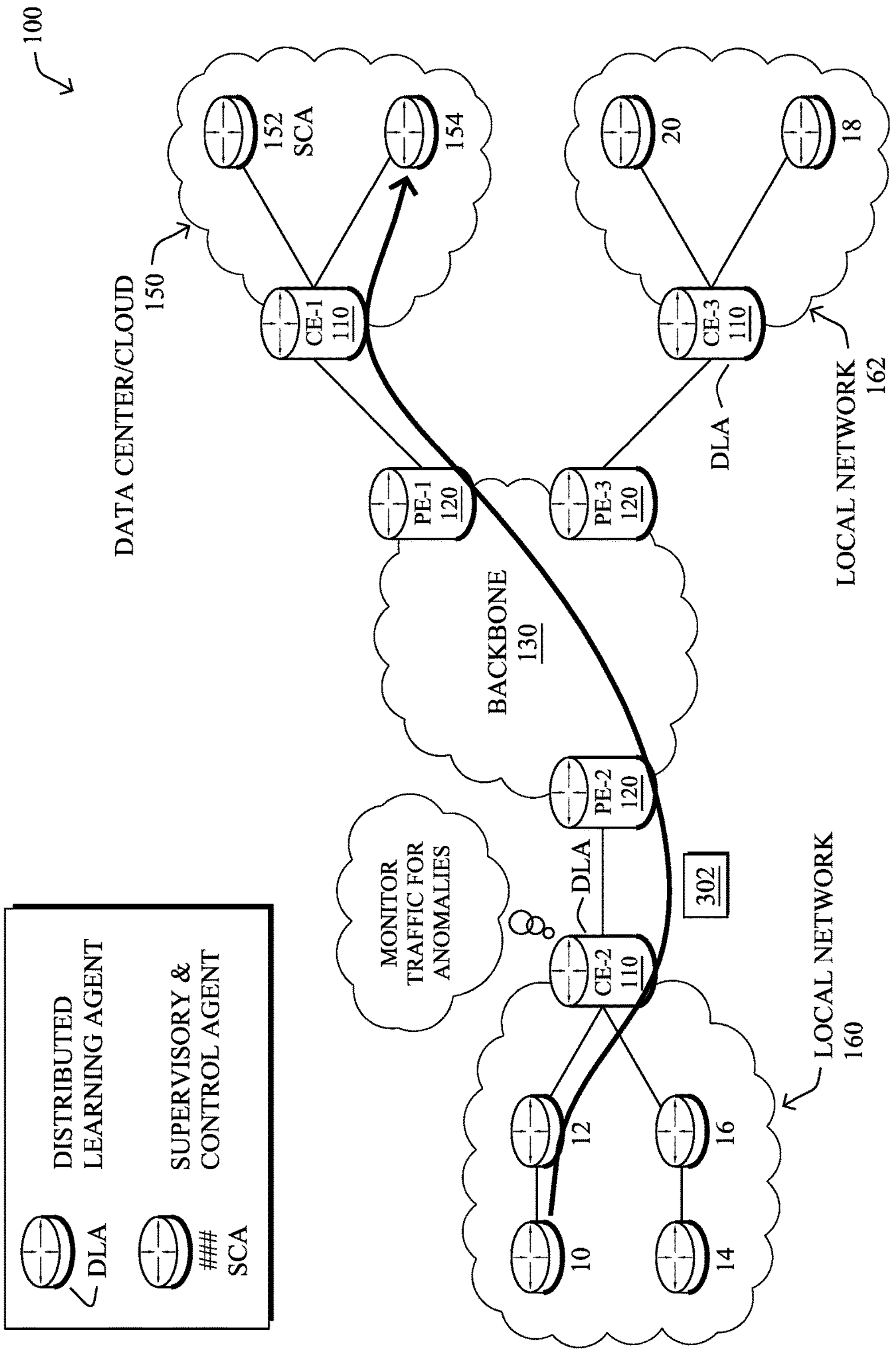
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
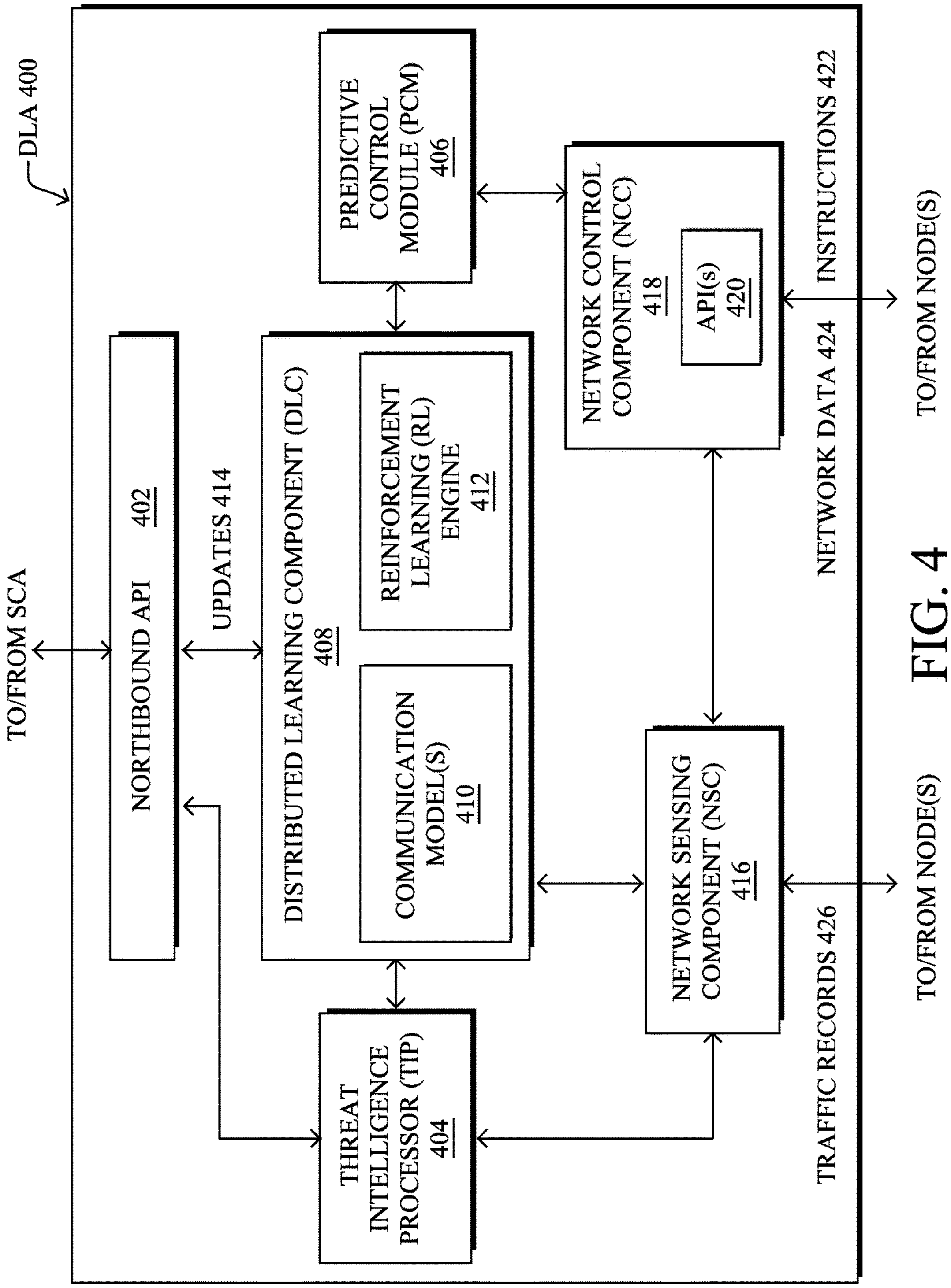
FIG. 4 illustrates an example distributed learning agent (DLA) in an SLN.

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feedback loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

Adjusting Anomaly Detection Sensitivity Based on User Behavior and Feedback

As noted above, anomaly detection systems rely on the notion of statistical likelihood, to determine whether a specific network event is anomalous. For example, an anomaly detector may model a distribution f(X) of historical data where X is a so-called feature vector in $R^n$ whose dimensions are the n features that quantify different network behaviors. Then, each new event i can be scored as the posterior probability $p=P(X_i| X_1, X_2, \ldots, X_{i-1})$, that is, the probability that $X_i$ occurs, given previous observations $X_1$ to $X_{i-1}$. An anomaly is then raised when p is "small enough." Notably, the smaller the value of p, the more "surprising" (i.e., anomalous) the corresponding event is. However, different users may expect different level of "surprise" from the events reported by the system (hence different values of p), even at the cost of more reported events.

Certain aspects of the techniques herein, therefore, are directed to a set of mechanisms to infer the value of p from the behavior of the user, as well as from explicit user feedback. Note that most learning systems make use of a number of processes and processing layers. In such systems, there is no simple value for p, although the overall concept still applies. It is also worth noting that experiments show a relatively wide range of acceptable values for p. Said differently, users tend to have very different views of what is expected from an anomaly detection system. The techniques herein, thus, provide a highly flexible and adaptive mechanism to adjust the overall sensitivity of the system to users' expectations. In other words, the techniques herein adjust the number of anomalies shown to a particular user in an anomaly detection system. To this end, statistics about the user behavior are used to infer his or her "capacity/expectations," that is, the number of anomalies he/she is willing or able to process in a given amount of time. Furthermore, the techniques herein allow for the user to request more or less reported anomalies through an "I want more/less" button that is directly available on the user interface.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Figure 5:
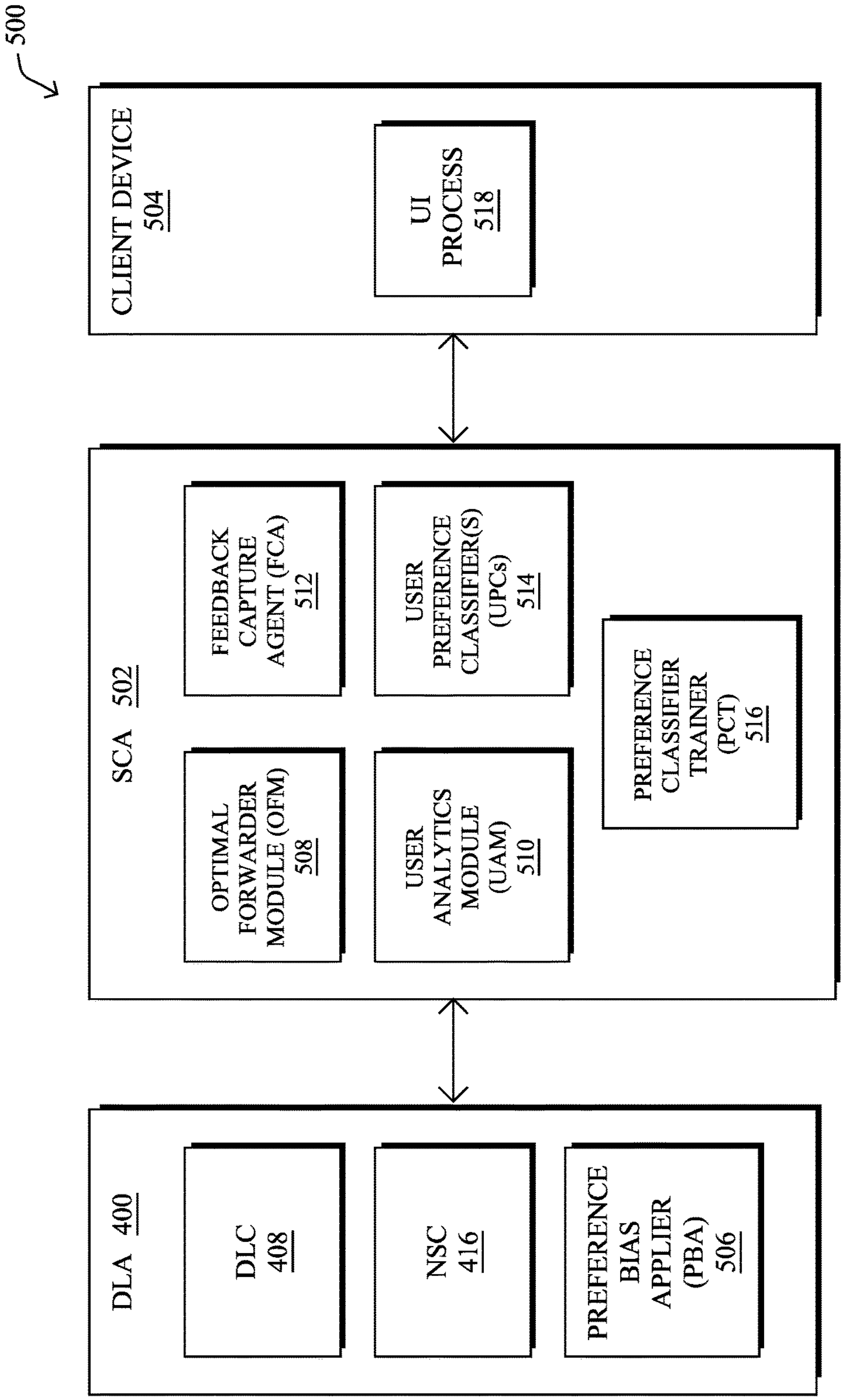
FIG. 5 illustrates an example architecture for implementing user assistance coordination in an SLN.

Operationally, FIG. 5 illustrates an example architecture 500 for implementing the techniques herein within an SLN, according to various embodiments. One aspect of the techniques herein illustratively involves a remote learning agent that is equipped with a machine learning-based anomaly detection engine, such as DLA 400 shown. Notably, the anomaly detection engine (e.g., DLC 408) may use a set of machine learning models, to detect anomalies at the edge of a local network. For example, DLC 408 may employ an unsupervised machine learning-based anomaly detector that identifies statistical deviations in the characteristics of the network traffic. DLA 400 may also employ a traffic capture mechanism (e.g., NSC 416, etc.) that is in charge of dynamically capturing traffic data of interest.

As described above, architecture 500 may also include an SCA 502 that provides supervisory control over DLA 400 and receives notification of any of the anomalies detected by DLA 400. In turn, SCA 502 may report the detected anomalies to a user interface (UI) process 518, which may be executed by a client device 504 in communication with SCA 502 or direction on SCA 502. Notably, SCA 502 may generate visualizations for display by UI process 518, thereby allowing an administrator or other user to review the anomaly detection mechanisms in the network and any detected anomalies. In response, the user may provide feedback via UI process 518 regarding any detected anomalies and/or the reporting mechanism to SCA 502. The user may also provide, via UI process 518, other configurations, settings, or the like, to SCA 502, to adjust the operation of the SLN.

One aspect of the techniques herein introduces an Optimal Forwarder Module (OFM) 508 that is used by the central controller, SCA 502, to decide whether an anomaly should be displayed to a particular user $U_i$ (e.g., via UI process 518). To that end, OFM 508 may rely on the notion of user capacity $C_i$, which denotes how many events per unit of time $\Delta t$ (typically, a day) the user $U_i$ can comfortably process. In other words, OFM 508 may determine an anomaly assessment rate that represents the number of anomalies that SCA 502 can report to UI process 518 and expect feedback regarding the anomalies within a given timeframe.

Indeed, it has been noticed in many other security systems that one of the main causes of undetected attacks is the presence of too many reported events, which de facto "prevent" the operator from focusing on those that matter. However, the capacity of the user may also change rapidly over time, due to his or her routine (e.g., partial work time, meetings, etc.) or irregular patterns (e.g., vacation or holidays), and can also vary significantly between users. As such, OFM 508 may represent the user capacity as a function of time $C_i(t)$.

In various embodiments, at any given time t, OFM 508 may decide to display an anomaly A to user $U_i$ via UI process 518 based on the number of anomalies recently displayed to the user and the current user capacity $C_i(t)$ such that he/she ends up receiving $C_i(t)$ anomalies per unit of time. OFM 508 may select the anomalies for reporting according to $C_i(t)$ and their corresponding severities and/or other internal scoring values. In one embodiment, OFM 508 may compute $C_i(t)$ as an average value over time, with potentially a excess rate to account for a sudden burst of critical anomalies. In yet another embodiment, OFM 508 may compute $C_i(t)$ as a function of the severity/relevancy score of the anomaly, on a per use basis.

Another aspect of the techniques herein introduces a User Analytics Module (UAM) 510, which is co-located with OFM 508 in SCA 502. In various embodiments, UAM 510 takes statistics about the behavior of user $U_i$ as input (e.g., time of activity, number of anomalies analyzed, number of anomalies rated favorably, total number of anomalies in its inbox), calculates the user capacity $C_i(t)$ based on these inputs, and provides the current user capacity $C_i(t)$ to OFM 508. Said differently, UAM 510 may calculate an anomaly assessment rate for the user and use this rate to control whether OFM 508 reports a given anomaly to UI process 518.

In its simplest embodiment, UAM 510 sets the user capacity to the average number of anomalies analyzed by user $U_i$ in the past few days, within some reasonable limits (e.g., there should be a minimal capacity to avoid that no anomaly is ever displayed to the user because he stopped analyzing anomalies for an extended period of time). In another embodiment, UAM 510 predicts the user capacity $C_i(t)$ based on a number of features (e.g., user behavior statistics, time of day, day of week), such that the system can capture subtle effects, such as the user's routine. To achieve this, UAM 510 may employ a regression-based learning mechanism, such as a Gaussian process, a Hidden Markov Model, a Recurrent Neural Network, or the like, which is trained on prior data from user $U_i$ and possibly other users. In one embodiment, UAM 510 may infer the capacity of a new user from those of one or more existing users and averaged out.

Figure 6A:
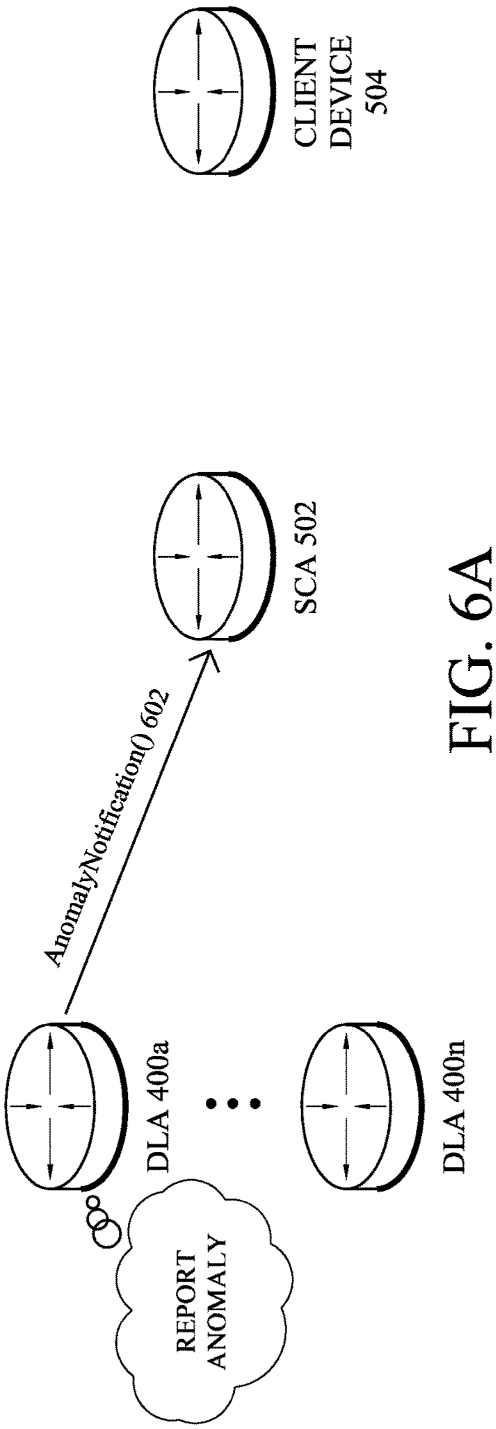
FIGS. 6A-6G illustrate examples of user assistance coordination in an SLN.

An additional aspect of the techniques herein is a mechanism whereby the user can provide direct feedback to the system about his or capacity. For example, referring now to FIG. 6A-6G, consider the example of SCA 502 overseeing any number of DLAs 400*a*-400*n* (e.g., a first through nth DLA), that each execute one or more network anomaly detectors. As shown in FIG. 6A, assume that DLA 400*a* detects an anomaly by analyzing network traffic in its local region. In turn, DLA 400*a* may send an AnomalyNotification( ) message 602 to SCA 502 that includes information regarding the detected anomaly (e.g., the anomaly score, the features analyzed by the anomaly detector, etc.). In some embodiments, DLA 400*a* may also retain further information, such as captured packets related to the anomaly, for later retrieval, such as on request by UI process 518.

Figure 6B:
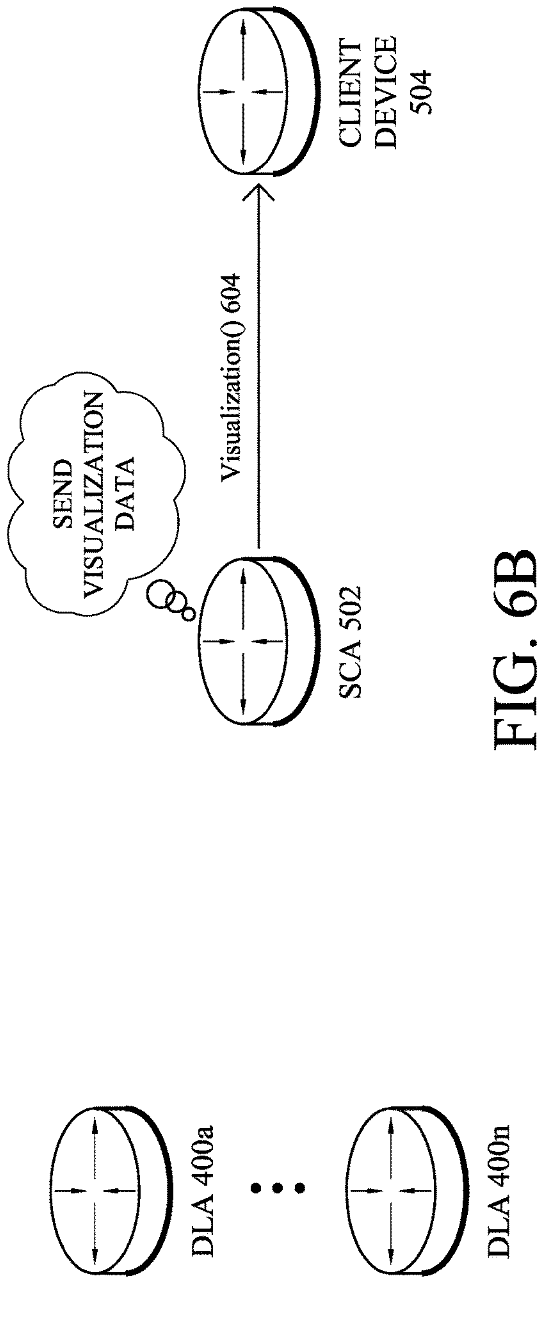

In FIG. 6B, SCA 502 may provide visualization data regarding the anomaly detected by DLA 400*a* to UI process 518 via a Visualization( ) message 604. Such a visualization may, for example, present information regarding the detected anomaly included in AnomalyNotification( ) message 602. In some embodiments, the visualization may also allow the user to request additional information from the detecting DLA 400*a* (e.g., captured packets, configurations, etc.) via SCA 502 for visualization.

Figure 6C:
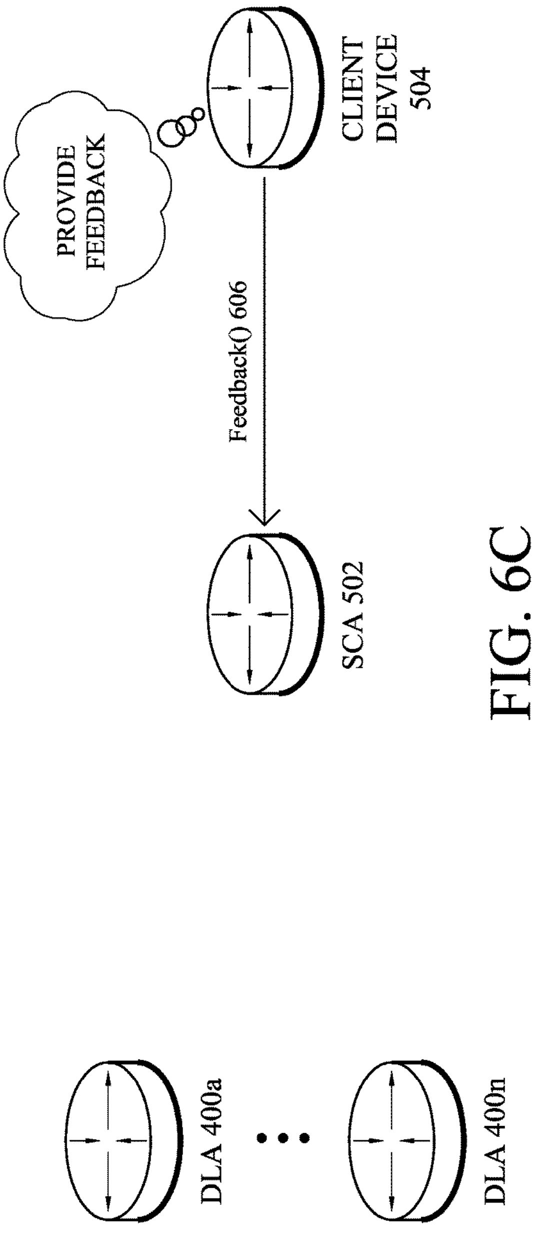

In various embodiments, the visualization presented to UI process 518 may further be configured to receive feedback from the user regarding the reported anomaly and/or the anomaly reporting mechanism itself. Notably, as shown in FIG. 6C, UI process 518 may provide feedback to SCA 502 regarding the reported anomaly and/or the anomaly reporting mechanism via Feedback( ) message 606. In some embodiments, the visualization interface presented to the user may include a button or other input mechanism that allows the user to indicate as feedback whether the user wishes to see more or less anomalies for review. For example, the interface may include a button labeled, "I want more!" Such a mechanism is referred to hereafter as a "More" button that, when selected, notifies SCA 502 via message 606 that the user is ready to see more anomalies.

Figure 6D:
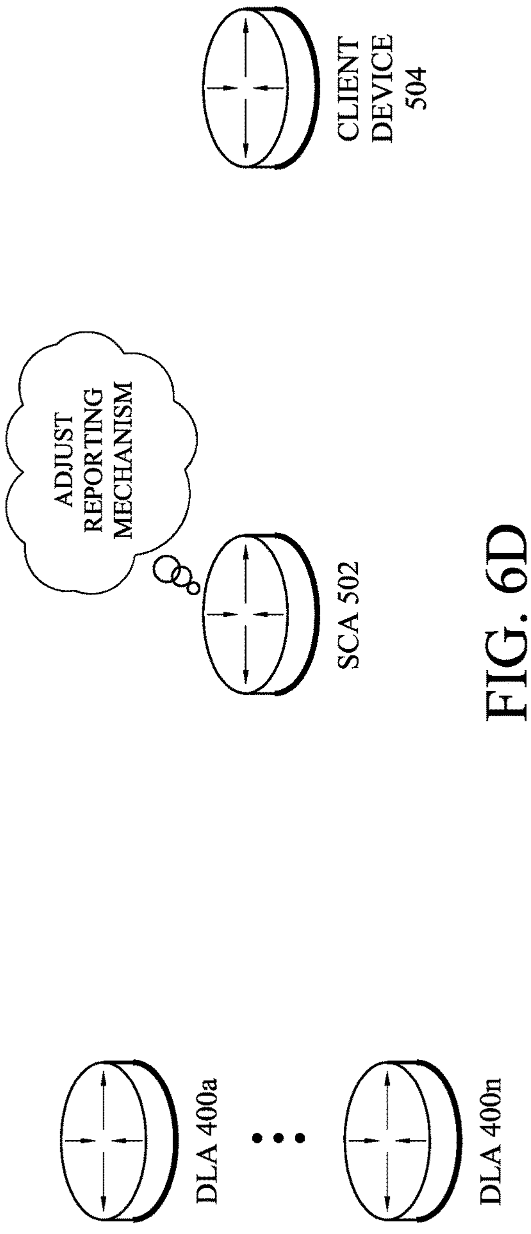

As shown in FIG. 6D, SCA 502 may adjust its anomaly reporting mechanism based in part on the user feedback provided via message 606. Note that the objective of such as simple feedback is not to change the behavior of the anomaly detection system itself, but rather to dynamically adjust the corresponding anomaly reporting mechanism that controls the set of anomalies reported to the user.

This direct feedback is processed by UAM 510 as one of the signals used to estimate $C_i(t)$ of course (see below for how it is used), but this can also be immediately used by OFM 508, to directly provide some of the runner-up events to UI process 518 that had been initially suppressed, thus providing a more powerful user experience. Since the user experience with the anomaly detection system is critical, the "More" button should remain a simple feedback making use of sophisticated and dynamic adjustments of the system while hiding the underneath complexity.

Another embodiment of this component is its "I want less!" counterpart (e.g., another input mechanism of the interface), which has the exact opposite effect, that is, making some of the lesser anomalies disappear from the screen. Feedback from such an input mechanism will also cause UAM 510 to reduce the capacity $C_i(t)$. One possible strategy used by UAM 510 to set $C_i(t)$ is to match the number of anomalies currently shown to the user, using a simple regression approach. Assuming that NM is the number of anomalies displayed to the user $U_i$ at time t, the UAM may use the following relation:

$$C_i(t) = \frac{N_i(t) - N_i(t - \Delta t)}{\Delta t} \quad \text{(Equation 1)}$$

where Δt is the characteristic time scale used to characterize $C_i(t)$. Hence, in absence of any feedback, $N_i(t)$ will indeed grow by $C_i(t)$ every Δt. Upon using the "More/Less" button, the user triggers sudden variations in $N_i(t)$ by $+/-M_i(t)$, thus implicitly adapting $C_i(t)$ through Equation 1. A more detailed example is shown below in Table 1.

Another aspect of the techniques herein is a mechanism whereby the effect of pressing the "More" button (or its "Less" counterpart) is adjusted dynamically by observing the reaction of the user. For instance, if UAM 510 displays $M_i(t)$ anomalies upon receiving a "I want more!" feedback, but then immediately receive an "I want less!" feedback shortly after, the value of $M_i(t)$ is obviously too high, and should be adapted to a value of $M'_i(t)<M_i(t)$. This type of adaptation shall only happen for feedbacks that occur within a short time interval, that is, the value for $M_i(t)$ is adjusted based on immediate feedback (say, in the order of a few minutes). Indeed, upon clicking on the "More" button, the user may feel that its effect is too large, so it may directly reverse it by using the "Less" button. In such cases, the value of $M_i(t)$ is adjusted by some factor α, as shown in the example Table 1 below:

TABLE 1

Time Evolution Assuming Δt = 2.0 days and α = 1.5

| Uptime [day] | Feedback | $U_i(t)$ | $M_i(t)$ | $N_i(t)$ |
|---|---|---|---|---|
| 0.5 | N/A | 10.0 | 5.0 | 5 |
| 1.0 | N/A | 10.0 | 5.0 | 10 |
| 1.5 | N/A | 10.0 | 5.0 | 15 |
| 2.0 | N/A | 10.0 | 5.0 | 20 |
| 2.5 | N/A | 10.0 | 5.0 | 25 |
| 2.5 + 1 sec | More! | (30 − 5)/2 = 12.5 | 5.0 | 30 |
| 3.0 | N/A | 12.5 | 5.0 | 33 |
| 3.0 + 1 sec | More! | (38 − 10)/2 = 14.0 | 5.0 | 38 |
| 3.0 + 4 sec | More! | (46 − 10)/2 = 18.0 | 5.0*α = 8.0 | 46 |
| 3.5 | N/A | 18.0 | 8.0 | 64 |
| 3.5 + 1 sec | Less! | (56 − 15)/2 = 20.5 | 8.0 | 56 |
| 3.5 + 3 sec | More! | (61 − 15)/2 = 23.0 | 8.0/α = 5.3 | 61 |
| 4.0 | N/A | 23.0 | 5.3 | 67 |

Beyond a few minutes, the fact that the user clicks on the "Less" button is (probably) not indicative of a too large value of $M_i(t)$ (whose effect is immediately observable by the user), but a too large adjustment of the capacity (which controls the rate at which anomalies are added to the user's inbox).

The above techniques, therefore, provide for adjusting anomaly detection sensitivity based on user behavior and feedback. In particular, a primary advantage of these techniques is to alleviate the issue found in other security systems whereby users miss important events because they are "flooded" by the system with many other irrelevant alerts (aka the "Christmas Tree" effect). That is, by setting an upper bound for the number of displayed anomalies based on the user processing capacity, the techniques herein alleviate the burden where an excessive number of raised anomalies will cause a user or system to just start ignoring them. Additionally, the techniques herein do not simply adjust sensitivity, but do so dynamically, as choosing a fixed/hard number of anomalies for purposes of reporting is an invalid criteria for the use of such systems.

Optimal Forwarding of Most Relevant Anomalies

As noted above, the system may throttle the reporting of anomalies to a user interface with a hard cap on the number of anomalies reported or produced in each given time interval. In particular, a high anomaly rate in a large scale anomaly detection system may unfortunately exceed what the user is able or willing to process. Assume, for example, that the user can process no more than a single anomaly in a time-interval T (T can be one hour, one day, etc.). Thus, a challenge still exists to present the user with the most relevant or valuable anomaly during T, based on the corresponding score of the anomaly. Further, when the system fails to report the most relevant anomaly in time period T, another challenge is to minimize the difference in scores between the highest scored anomaly during T and anomaly that was actually reported.

Note that this formulation of the problem is not to be confused with weaker formulations where the objective is that the user processes on average one anomaly per time interval. Indeed, unless the distribution of the scores is very stable, the user may be swamped with anomalies during certain periods, and have none to process in some others. Being able to show no more than one anomaly during each time interval is extremely valuable.

The techniques herein can be used to present the most relevant anomaly detected in a given time interval to a user of an anomaly detection system. It does so in a provably optimal way, while respecting a hard constraint on the number of anomalies presented. The techniques also estimate the anomaly arrival time density, and mitigate against attacks that could otherwise capitalize on when the system may detect but not forward the detected anomaly to a system/user.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, and with respect again to architecture 500 shown in FIG. 5, OFM 508 may receive a series of messages that represent anomalies. For example, OFM 508 receive anomaly notification messages from the DLAs over which SCA 502 supervises (e.g., messages 602). These messages are received either through function, method calls, or message passing within the same program, or through IPC on the same hosts, or through network sockets. They contain information that will be presented to the user (or another component of the system), through a user interface, and scores.

In general, scores are quantities that may be used to order the messages received during the time interval I, and therefore, the relevance or value of the anomalies they represent. Furthermore, OFM 508 may be given a series of time intervals. These are either specified by the user directly through UI process 518 (e.g., via feedback messages 606 shown in FIG. 6C) or through a configuration file, or preconfigured, or computed based on a simple formula (e.g. periodic intervals of duration T) during each of which the user must be presented with no more than one anomaly. The operation of the timing mechanism is fully determined by its operation on each interval I. Accordingly, the techniques herein are described with respect to a single interval I, with the assumption that I=[0, T].

The user may choose a value of T in accordance with their capacity in handling anomalies reported by the system (e.g., based on their anomaly assessment rate). However, it is reasonable to assume a typical value of T of 1 hours, so that about 15 anomalies may be reported for assessment each day, on average, as 24*(1−exp(−1)) is approximately 15.

Upon reception of each anomaly from a DLA, numbered i (where i is a non-negative integer) during the time interval I, i.e., anomaly $A_i$, with score $S_i$, OFM 508 may determine whether to report the anomaly downstream (e.g., to the user via UI process 518). The first step of such analysis may entail checking whether another anomaly has already been reported to the user during time interval I. If so, then the current anomaly $A_i$ is not forwarded to UI process 518 for reporting. If not, then processing of the anomaly $A_i$ by OFM 508 may continue in several ways.

In a first such embodiment, the following assumptions are made. First, that all orders of arrival are equally likely, i.e., that the vector of the indices of the anomalies sorted by score is distributed along a uniform distribution on the set of permutations on [[0, N]] where N is the total number of anomalies received during I. This is true, in particular, when scores of successive anomalies are independent, which is a reasonable hypothesis. Second, it is also assumed the arrival time density on I is known, as described below regarding the estimation of arrival time density, and called f.

OFM 508 in this embodiment may compute $t_0$, the element of [0, T], such that $F(t_0)=1/e$. Then, if OFM 508 received $A_i$ at time $t<t_0$, the anomaly $A_i$ is not reported to UI process 518, but its score is recorded as $S_i$. If $A_i$ has been received by OFM 508 at time $t\geq t_0$, then $A_i$ is forwarded to UI process 518 for reporting to the user, if its score $S_i$ is greater than all previous scores. If not, OFM 508 does not report anomaly $A_i$ and OFM 508 records its score, as well. As would be appreciated, it is proven that this approach succeeds for a probability of at least 1/e, is the unique strategy yielding this result, no strategy can yield a better result (e.g., forwarding an anomaly, on expectation, for a fraction of the intervals equal to 1−1/e).

If the number of anomalies in each interval I is known beforehand, the same approach may be applied. Other embodiments may also be applied if the objective is altered slightly. For example, if the distribution of scores is known, and if the objective is not to select the best anomaly (e.g., payoff=1 if the reported anomaly has the highest score, or 0 in all other cases), but instead is to maximize the score of the anomaly chosen (therefore payoff=score of the anomaly forwarded in any case), then another approach may be used.

The above approach by OFM 508 may exhibit a peculiar behavior that may be undesirable in certain implementations. Notably, in the above approach, OFM 508 does not forward any anomaly during the $[0,t_0]$ interval. This can be detected and taken advantage of by an attacker. Therefore, instead of using a single instance of the process described above, further embodiments provide for the use of an M-number of forwarding/reporting processes that can be used in parallel to counter this issue. Such a configuration is referred to herein as a multiple optimal forwarder approach of order M.

For the sake of simplicity, assume that OFM 508 monitors anomalies over an interval [0, T], and each optimal forwarder in OFM 508 is used during a period of 1. By definition, T is supposed to be much greater than 1. The solution using optimal forwarders is to use one for the interval [0, 1], then reset its state and use it for the interval [1, 2], and so on and so forth until [(T−1), T]. A multiple optimal forwarder of order M includes M-number of optimal forwarders, each of which has a period M, so that the optimal forwarder of number m is used during a time interval offset by 1 from the optimal forwarder of number m−1. The input of a multiple optimal forwarder is fed to one of the optimal forwarders by uniform random sampling.

As an example, assume that the interval during which anomalies are received is [0, 6] (i.e., T=6). A single optimal forwarder would operate on [0,1], then [1,2], then [2,3], etc. until [5,6]. A multiple optimal forwarder of order 2 would use two optimal forwarders in parallel. The first one would operate on [0,2], then [2, 4], then [4, 6], and the second one on [1, 3], [3, 5], [5, 7] (the last part of the last interval is ignored). Each of the two optimal forwarders of OFM 508 receives an anomaly with probability 0.5.

Furthermore, the optimal forwarder results in a non-uniform distribution of anomaly forwarding time g_T(t), even if the input arrival times obey a uniform distribution, where g is periodic of period T. The multiple optimal forwarder of order M has a distribution:

$$\sum_{m=0}^{M-1} \frac{g_{MT}(t-mT)}{M} \quad \text{Equation 2}$$

For suitable values of M, this brings the density of anomaly forwarding times closer to the density of a uniform distribution.

Regarding the estimation of arrival time density, several hypotheses can be made about the density of arrival of anomalies. In the simplest embodiment, anomalies can be assumed independent and the arrival density uniform. However, anomalies in a network are often not independent. A brute-force scan, for instance, may generate bursts of anomalies concerning different hosts at almost the same time. In this case, when the first anomaly is observed, the estimate of the arrival density should be increased for the near future.

In a further embodiment, OFM 508 may model the dynamics of the anomaly arrival density. This can be done, for instance, using time series prediction methods such as ARMA models. The prediction of the anomaly arrival density can be further enhanced by optimally weighting the actual density observed and the prediction of this density by the learned dynamical model, using Kalman filters, for instance. For this embodiment, OFM 508 may use a stationary state transition model (x_{t+1}=x_t), so that the predicted anomaly arrival density would be uniform when the underlying dynamical system model becomes inaccurate (isolated anomalies for instance). When several correlated anomalies start arriving at OFM 508, the prediction is enhanced by giving more weight to the dynamical model.

Thus, the above techniques provide for the optimal forwarding/reporting of the most relevant anomalies identified by an anomaly detection system. In particular, the techniques herein provide a way to both forward the most relevant anomaly in a given time interval while capping the number of anomalies forwarded. This is advantageous from a user experience perspective, as it enables the user to focus on a fixed number of anomalies, while at the same time showing the most useful and valuable ones. The techniques herein also make no excessive hypotheses that would be invalidated in production, and offer a method to adapt itself to the input rate of anomalies. Lastly, the optimal forwarder can be combined with itself to form a multiple optimal forwarder, which offsets its most notable drawback, i.e., the waiting period in each time interval.

Machine Learning-Based User Feedback Learning for Anomaly Reporting

Also as noted above, a user of an anomaly detection system may have limited capacity to review each and every anomaly raised in the network, leading to the system having to select which anomalies are reported to the user. In this regard, false positives are particularly challenging, as reporting a false positive or too many false positives in a given timeframe may prevent a true positive from being reported to the user.

Generally, false positives can result from two possible situations: 1.) real false positives from a machine learning standpoint (e.g., the system is too sensitive, interpretation of reconstruction error has not been set correctly, etc.) and 2.) reported anomalies that are statistically anomalous, but not of interest to the user. Notably, if too many anomalies are reported that are not of interest to the user, the user may perceive the system as having a high false positive rate. For example, assume that users in a particular company are more interested in analyzing anomalies related to data exfiltration than other types of anomalies. Furthermore, amongst the group of users of such a system, there may be a user that is more interested in spending time analyzing anomalies related to DNS traffic, while another user may be more interested in anomalies that involve a certain type of hosts in their network. However, the system will show them the information without taking this preference into account, when selecting which anomalies are reported to a user interface for review.

The techniques herein, therefore, employ machine learning to learn the anomalies of interest to users via feedback received about the raised anomalies. Notably, in some aspects, the system may gather and learn both individual and global user feedback about anomalies, to select anomalies for reporting according to the learned behavior. In some aspects, these techniques can also update the behavior of the anomaly detection mechanism, in addition to that of the reporting mechanism, to keep it constantly adapted to user feedback and avoiding the potential bias that could be introduced in the learned behavior by the fact of deciding not to forward certain anomalies. Said differently, the techniques herein introduce a fully distributed, adaptive, and scalable system for learning the type of anomalies of interest for users of a distributed learning system, such as an SLN. This information is then used for deciding which anomalies are reported/forwarded up to the user, improving the bandwidth utilization and filtering out anomalies that the user would consider false positives. In some aspects, user feedback is gathered by a central component, such as an SCA, through a user interface and then used to model user relevancy using a classifier. Such classifier is then dynamically trained, using a central or distributed approach, to determine a probability for the anomaly to be forwarded according to the computed relevancy and confidence of the model.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, and with further reference to architecture 500 shown in FIG. 5, the techniques herein are directed to a system for capturing user feedback related to anomalies raised by the system, and to use this learned behavior for biasing the detection towards anomalies that match the user feedback.

As shown, one aspect of the techniques herein introduces a Feedback Capture Agent (FCA) 512, which may be co-located on the centralized agent, SCA in an SLN. FCA 512 may receive at least a portion of the user feedback from UI process 518 that labels a reported anomaly as "important," "relevant," "irrelevant," etc., which the user may provide explicitly via UI process 518. For example, Feedback( ) message 606 shown in FIG. 6C may indicate the label provided by the user regarding the reported anomaly. In some cases, FCA 512 may also evaluate implicit feedback regarding the anomaly/reporting mechanism, such as the amount of time the user spent analyzing the anomaly, statistics about seen and unseen anomalies, etc.

Generally, the objective of FCA 512 is to collect both types of user feedback (e.g., explicit and implicit) regarding a reported anomaly and store the feedback in such a way that the feedback data can be easily accessed by other components, such as any of the other modules 508-510 or 514-516. Note that the proposed techniques do not require the user to specify why a reported anomaly is of interest. Instead, the proposed techniques are able to infer and model the underlying reason, which is a much superior approach. Further, while separate modules 508-516 are described with respect to architecture 500, this implementation is for illustrative purposes only and the operations described herein with respect to modules 508-516 can be implemented as combined modules, across further sub-divided modules, distributed modules, or the like.

Another aspect of the techniques herein is a User Preference Classifier (UPC) 514, also shown in architecture 500 in FIG. 5 as co-hosted by SCA 502. In various embodiments, UPC 514 is a machine learning-based probabilistic classifier trained to classify detected anomalies into relevant or irrelevant categories, according to user feedback. Notably, user feedback can be revisited at any order to unlearn user preference and potentially retrain UPC 514.

Indeed, given a detected anomaly and a potentially very large number of features describing this anomaly, such as the duration, the number of involved hosts, the applications involved, location of the offending traffic, etc. (e.g., as reported to SCA 502 by a notification message 602, as shown in FIG. 6A), UPC 514 may compute the probability that a user of UI process 518 would tag the reported anomaly as relevant.

In one embodiment, UPC 514 may attempt to predict an "aggregated" preference of all users. In another embodiment, UPC 514 may predict the preference of specific users. Both embodiments can coexist simultaneously on the same distributed learning system, and the Preference Bias Applier (see below) can manage all of them.

A type of classifier well suited to the function of UPC 514 is the Probit classifier. Indeed, this classifier can provide the probability of tagging as "relevant" or "irrelevant," along with an estimate of its confidence in this prediction. This confidence estimation is very useful for training unbiased classifiers after performing a sampling of the training samples. Note that some anomalies will not be forwarded/reported to UI process 518, as detailed above. Accordingly, these anomalies will not be tagged, which could produce a bias in the training, if not handled carefully.

A further aspect of the techniques herein is a Preference Classifier Trainer (PCT) 516. There are two embodiments of this component. In one embodiment, PCT 516 is co-located on SCA 502, as shown in FIG. 5, and is in charge of training the UPC(s) 514 and deploying them across the distributed learning system. PCT 516 then performs the following operations periodically:

1) Collect all the anomalies received from the DLAs since the last training step.
2) Compute the features of the collected anomalies.
3) Collect all the feedback received via UI process 518 since the last training step.
4) Generate a training set by linking input features with the feedback data, and
   a) If there are user specific UPCs 514, generate the corresponding training sets by splitting the global training set according to the user that generated the feedback information.
5) Perform a training step for the different UPCs 514 in the distributed learning system. Since labels are not available for all the anomalies, the training must take into account for obtaining an unbiased classifier. Indeed, since only a subset of the anomalies have a user feedback and only these anomalies can be used on a supervised training, the training process must take this into account. For example, consider the situation in which the user only provides feedback for anomalies involving HTTP traffic. If the training does not take into account that only a subset of the whole set of anomalies have feedback, the training process can prevent severe overfitting by generalizing the characteristics observed in the HTTP-related anomalies to any type of anomalies. The statistical techniques that handle this kind of problems are generally known as Importance Sampling Techniques.
6) Deploy the computed UPCs 514 into their respective DLAs 400.

Figure 6E:
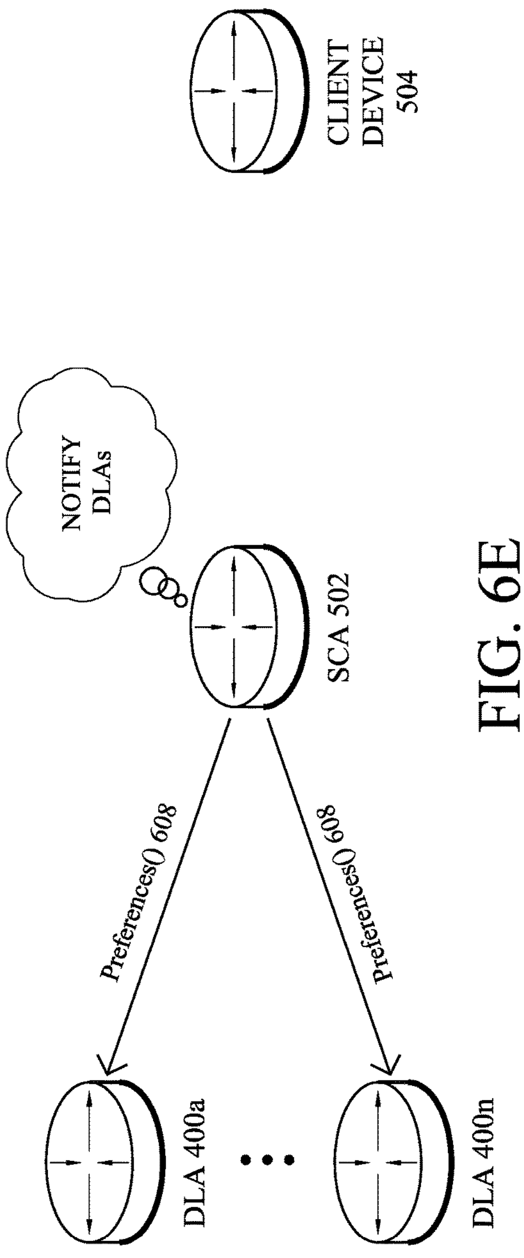

In a second embodiment, FCA 516 forwards the feedback of each user to the corresponding DLA 400. For example, as shown in FIG. 6E, SCA 502 may send Preferences( ) messages 608 back to DLAs 400*a*-400*n* that indicate the user feedback received via Feedback( ) messages 606 from UI process 518. In turn, each DLA 400*a*-400*n* may execute its own PCT 516 that uses this feedback to train the UPC 514 directly at the edge. In this embodiment, PCT 516 performs the same step as in its centralized version (e.g., as on SCA 502), except for step 6 above.

Figure 6F:
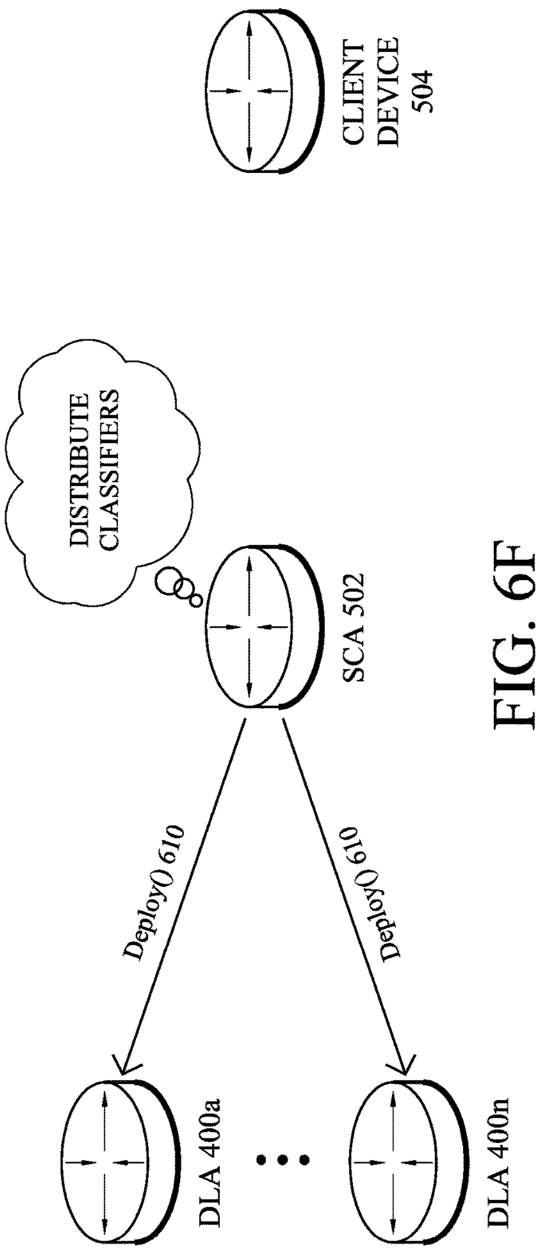

As shown in FIG. 6F, SCA 502 may deploy UPCs 514 to DLAs 400*a*-400*n* using a newly defined Deploy( ) message 610 for use by Preference Bias Appliers (see below). A Deploy( ) message 610 may have the following fields:

List of input features of the classifier; and

List of parameters of the classifier (e.g., the result of the training process).

Figure 6G:
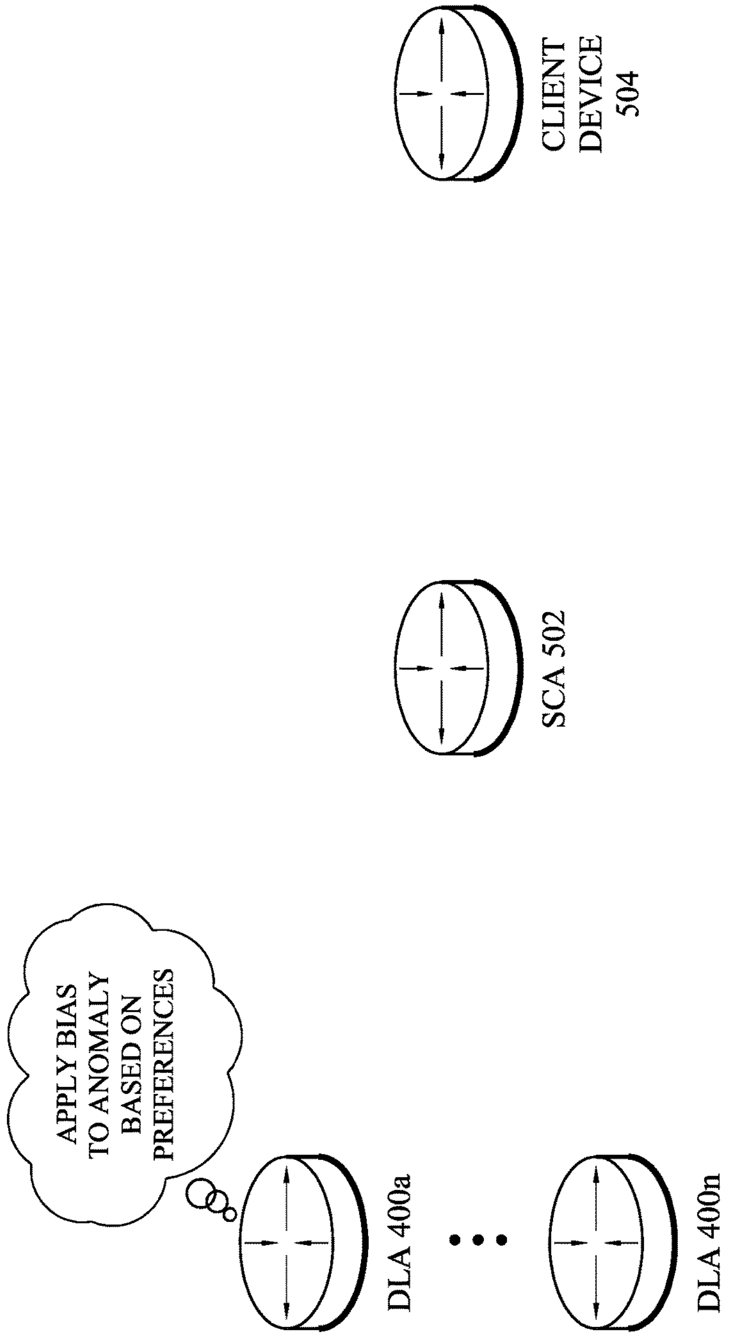

Referring again to FIG. 5, another aspect of the techniques herein introduces a Preference Bias Applier (PBA) 506, which is in charge of deciding whether to forward an anomaly based on the prediction of the deployed UPC 516. For example, as shown in FIG. 6G, DLA 400*a* may use PBA 506 to apply a bias to a detected anomaly, to determine whether to report the anomaly. In particular, PBA 506 may perform any or all of the following operations:

1) After detection of a new anomaly (e.g. at the edge of the network on the remote learning agent), compute the input features of all the UPCs 516 managed by this PBA.
2) Obtain the output of all the managed UPC s 516.
3) For each managed UPC 516, perform an importance sampling of the anomaly, as described below. Recall that importance sampling is a statistical technique that, amongst other things, allows for the training of unbiased classifiers from biased training sets. The technique generally entails designing an "importance function" that, for each sample, gives the probability of using this sample for training or not, and the samples are randomly chosen according to these probabilities. In the current case, the importance function may be a function of the classification output and the confidence of the classifier on this output. The former is directly the output of the classifier itself, while the latter is a measure of the estimated variance of the classifier output. Then, the importance sampling process is done as follows:

If the output is "irrelevant" with high confidence, mark the anomaly to be forwarded with a very low probability (i.e., not interesting, but from time to time some anomalies of this type are forwarded for validating the classifier validity);

If the output is "relevant" with high confidence, mark the anomaly to be forwarded (i.e., interesting anomaly, therefore always forwarded);

If the output has a low confidence, mark the anomaly to be forwarded with a very high probability (i.e., the classifier does not know how to classify it, therefore usually forwarded for collecting data that will improve the classifier in a future training).

Note that dropped anomalies may be stored for future forensic analysis and stored in a central controller, such as SCA 502.

4) If the anomaly has been marked at least by one UPC 516 to be forwarded, forward this anomaly to the next level of the distributed learning system using an anomaly message that contains the following fields:

The anomaly data;

The information about the importance function for each applied UPC 516. Indeed, this information is required for the importance sampling technique used for produced the unbiased classifier (explained above); and The information about the UPCs 516 that marked the anomaly to be forwarded (information needed for training unbiased classifiers).

As would be appreciated, importance sampling may use any number of statistical techniques known to those skilled in the art.

The techniques herein further distinguish between the two embodiments of PBA 506: 1.) a PBA 506 executed centrally by SCA 502 that decides which anomalies are shown to each user and 2.) a distributed PBA 506 that runs in a DLA 400 and decides which anomalies are shown to each user, while optimizing the amount of bandwidth used by the DLA. Note that like in the case of the UPC 516, both embodiments of the PBA 506 can coexist simultaneously on the same distributed learning system. Said differently, either or both of DLAs 400 and SCA 502 may apply the user preference classifier to a detected anomaly and selectively report anomalies based on the classification.

The techniques described herein, therefore, provide for the use of machine learning to learn user feedback learning for purposes of anomaly forwarding/reporting. In particular, the techniques herein provide a fully distributed, adaptive, and scalable mechanism for biasing the type of anomalies forwarded by a distributed learning system such as SLN, with the objective of improving the user experience and their satisfaction with the type of anomalies that are shown. In some aspects, a first tier classifier may be installed on a central agent and be trained based on the past user decisions, thereby allowing for the filtering out of anomalies that are uninteresting to the user from being reported. In further aspects, a second tier classifier can be installed on the edge nodes/DLAs, which reduces the amount of bandwidth consumed by the distributed system and selects anomalies for forwarding, not only to discard false positives, but also to provide high information samples for training the first tier classifier. This is done by randomly conditioning the decision to forward an anomaly based on the output of the classifier computed by the PCT.

Figure 7:
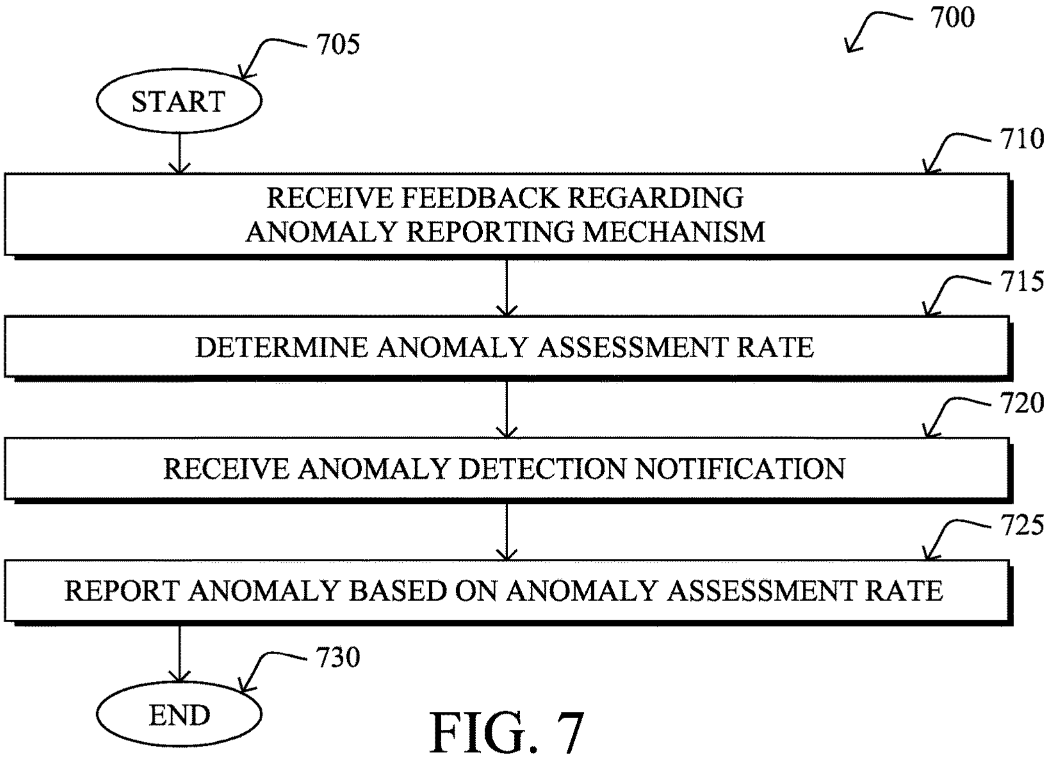
FIG. 7 illustrates an example simplified procedure for reporting an anomaly using an anomaly assessment rate.

FIG. 7 illustrates an example simplified procedure for reporting an anomaly using an anomaly assessment rate, in accordance with various embodiments herein. Generally, procedure 700 may be performed by a specialized device in a network, such as an SCA in an SLN. Procedure 700 may start at step 705 and continues on to step 710 where, as described in greater detail above, the device may receive feedback regarding an anomaly reporting mechanism. In various embodiments, such feedback may indicate whether the anomaly reporting mechanism reported a relevant/important anomaly to the user, whether the user wishes to receive greater or fewer anomaly reports in a given time period, a time span during which the user wishes to receive only a fixed number of reported anomalies, or any other feedback regarding anomalies reported to the user via a user interface. In further cases, the feedback may be implicit, such as how frequently or how often the user provided an assessment of the reported anomalies, etc.

At step 715, as detailed above, the device may determine an anomaly assessment rate based in part on the feedback. In general, such a rate corresponds to the rate at which the device expects to receive user feedback regarding reported anomalies to the user interface. This rate may be a function of the capacity of the user to review reported anomalies in a given time frame. For example, the user may only be able to review one anomaly per hour. In various cases, the device may adjust the anomaly assessment rate, e.g., based on an explicit request by the user to adjust the rate, based on how timely the user assessed prior anomalies, etc.

At step 720, the device may receive an anomaly detection notification from a particular distributed learning agent, as described in greater detail above. Notably, the agent may execute a machine learning-based anomaly detector to assess whether network traffic in its local portion of the network is statistically anomalous. If so, the agent may report the details of the detected anomaly to the device.

At step 725, as detailed above, the device may report the anomaly, via its anomaly reporting mechanism, to a user interface device for presentation to a use. In various embodiments, the device may base the reporting on the determine anomaly assessment rate. For example, the device may attempt to report only the anomaly for a given time frame that has the highest relevancy or anomaly score. In other cases, the device may suppress reporting of certain anomalies that are deemed irrelevant by a machine learning-classifier that is trained using feedback from the user regarding reported anomalies. Procedure 700 then ends at step 730.

Figure 8:
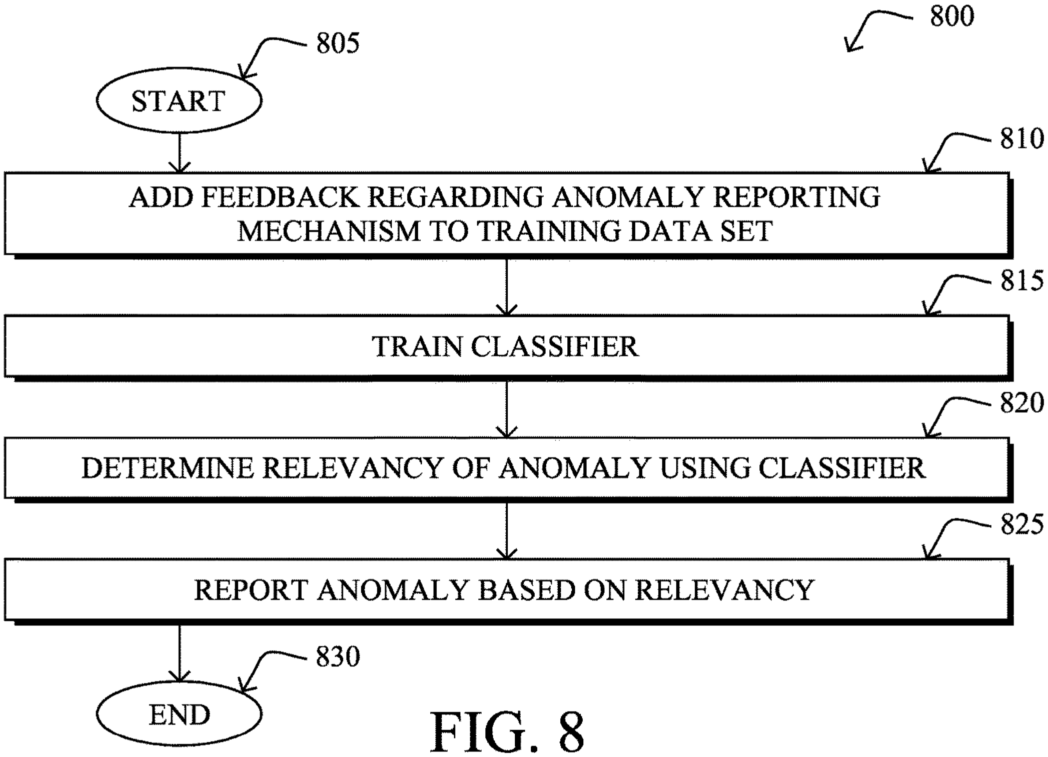
FIG. 8 illustrates an example simplified procedure for reporting an anomaly based on a determined relevancy.

FIG. 8 illustrates an example simplified procedure for reporting an anomaly based on a determined relevancy, in accordance with further embodiments herein. Generally, a specialized device in a network, such as an SCA, DLA, or the like, may perform procedure 800 by executing stored instructions. Procedure 800 may start at step 805 and continues on to step 810 where, as described in greater detail above, the device may add feedback regarding an anomaly reporting mechanism to a training data set. For example, such feedback may indicate that the reporting mechanism reported an anomaly to a user interface that the user did not find relevant.

At step 815, as detailed above, the device may train a machine learning-based classifier using the training data set. Such a classifier may be configured to determine whether a particular user or set of users would find a detected anomaly to be relevant. For example, assume that a user is not concerned with HTTP-related traffic and repeatedly tags HTTP-related anomalies as irrelevant. In such a case, the device may train the classifier such that further HTTP-related anomalies are also classified as irrelevant.

At step 820, the device may determine a relevancy of a detected anomaly using the trained classifier, as described in greater detail above. Notably, if a particular DLA in the network detects an anomaly, the device may use the trained classifier to determine the relevance of the anomaly to the user or set of users.

At step 825, as detailed above, the device may report the detected anomaly based on the determined relevance. For example, if the classifier determines that the detected anomaly would be of interest/relevance to the user, the device may report the anomaly to the user via a user interface or to a supervisory controller. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

While there have been shown and described illustrative embodiments that provide for adjusting anomaly detection sensitivity based on user behavior and feedback, the optimal forwarding of detected anomalies, and for machine learning-based user feedback learning for anomaly reporting, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a device in a network, feedback regarding an anomaly reporting mechanism used by the device to report network anomalies detected by a plurality of distributed learning agents to a user interface, wherein the feedback includes information about how the network anomalies are reported by the anomaly reporting mechanism;

determining, by the device, an anomaly assessment rate at which a user of the user interface is expected to assess reported anomalies based in part on the feedback;

receiving, at the device, an anomaly notification regarding a particular anomaly detected by a particular one of the distributed learning agents;

dynamically adjusting, by the device, a number of anomalies reported to the user interface based on the determined anomaly assessment rate, wherein the determined anomaly assessment rate is an inference made by a machine learning model based on a behavior of a user and the feedback, wherein the anomaly reporting mechanism is adjusted rather than a classifier on the plurality of distributed learning agents; and reporting, by the device and via the anomaly reporting mechanism, the particular anomaly to the user interface according to the adjustment.

2. The method as in claim 1, wherein the feedback comprises a request that the anomaly reporting mechanism report more or less anomalies.

3. The method as in claim 1, wherein reporting the particular anomaly to the user interface based on the determined anomaly assessment rate comprises:

grouping, by the device, a plurality of anomalies associated with a given time interval, wherein the plurality of anomalies comprises the particular anomaly;

determining, for each of the plurality of anomalies, a relevancy score; and reporting the particular anomaly to the user interface based on a comparison of the relevancy scores of the plurality of anomalies.

4. The method as in claim 3, further comprising:

using, by the device, a model to predict a quantity of anomalies associated with the given time period.

5. The method as in claim 3, further comprising:

grouping, by the device, a second plurality of anomalies associated with a second time interval, wherein the second time interval partially overlaps the given time interval;

determining, for each of the second plurality of anomalies, a relevancy score; and reporting a selected one of the second plurality of anomalies anomaly to the user interface based on a comparison of the relevancy scores of the second plurality of anomalies.

6. The method as in claim 1, wherein determining the anomaly assessment rate comprises:

modeling, by the device, a history of anomaly assessments received via the user interface.

7. The method as in claim 1, further comprising:

adding, by the device, the feedback to a training data set comprising a plurality of feedback regarding a plurality of anomalies reported to the user interface;

training, by the device, a machine learning-based classifier using the training data set to determine a relevancy for a detected anomaly;

determining, by the device, a relevancy for the particular anomaly; and reporting, by the device and via the anomaly reporting mechanism, the particular anomaly to the user interface based in part on the determined relevancy.

8. The method as in claim 7, further comprising:

providing, by the device, the determined relevancy for the particular anomaly to the particular distributed learning agent that detected the particular anomaly, wherein the particular distributed learning agent is configured to use the provided relevancy to suppress anomaly notifications to the device based in part on the determined relevancy.

9. A method comprising:

adding, by a device in a network and to a training data set, feedback regarding an anomaly reporting mechanism used by the device to report network anomalies detected by a plurality of distributed learning agents to a user interface, wherein the feedback includes information about how the network anomalies are reported by the anomaly reporting mechanism;

training, by the device, a machine learning-based classifier using the training data set to determine a relevancy for a detected anomaly;

determining, by the device, a relevancy for a particular anomaly detected by a particular one of the distributed learning agents;

dynamically adjusting, by the device, a number of anomalies reported to the user interface the determined relevancy, wherein the determined relevancy is an inference made by a machine learning model based on a behavior of a user and the feedback, wherein the anomaly reporting mechanism is adjusted rather than a classifier on the plurality of distributed learning agents; and reporting, by the device and via the anomaly reporting mechanism, the particular anomaly to the user interface according to the adjustment.

10. The method as in claim 9, further comprising:

providing, by the device, the determined relevancy for the particular anomaly to the particular distributed learning agent that detected the particular anomaly, wherein the particular distributed learning agent is configured to use the provided relevancy to suppress anomaly notifications to the device based in part on the determined relevancy.

11. The method as in claim 9, further comprising:

deploying, by the device, the trained classifier to a particular distributed learning agent, wherein the particular distributed learning agent is configured to use the classifier to determine whether to report a detected anomaly to the device.

12. The method as in claim 9, further comprising:

determining, by the device, an anomaly assessment rate at which a user of the user interface is expected to assess reported anomalies based in part on the feedback;

receiving, at the device, an anomaly notification regarding the particular anomaly detected by a particular one of the distributed learning agents; and reporting, by the device and via the anomaly reporting mechanism, the particular anomaly to the user interface based in part on the determined anomaly assessment rate.

13. An apparatus, comprising:

one or more network interfaces to communicate with a network;

a processor coupled to the network interfaces and configured to execute one or more processes; and a memory configured to store a process executable by the processor, the process when executed operable to:

receive feedback regarding an anomaly reporting mechanism used by the apparatus to report network anomalies detected by a plurality of distributed learning agents to a user interface, wherein the feedback includes information about how the network anomalies are reported by the anomaly reporting mechanism;

determine an anomaly assessment rate at which a user of the user interface is expected to assess reported anomalies based in part on the feedback;

receive an anomaly notification regarding a particular anomaly detected by a particular one of the distributed learning agents;

dynamically adjust a number of anomalies reported to the user interface based on the determined anomaly assessment rate, wherein the determined anomaly assessment rate is an inference made by a machine learning model based on a behavior of a user and the feedback, wherein the anomaly reporting mechanism is adjusted rather than a classifier on the plurality of distributed learning agents; and report, via the anomaly reporting mechanism, the particular anomaly to the user interface according to the adjustment.

14. The apparatus as in claim 13, wherein the feedback comprises a request that the anomaly reporting mechanism report more or less anomalies.

15. The apparatus as in claim 13, wherein the apparatus reports the particular anomaly to the user interface based on the determined anomaly assessment rate by:

grouping a plurality of anomalies associated with a given time interval, wherein the plurality of anomalies comprises the particular anomaly;

determining, for each of the plurality of anomalies, a relevancy score; and reporting the particular anomaly to the user interface based on a comparison of the relevancy scores of the plurality of anomalies.

16. The apparatus as in claim 15, wherein the process when executed is further operable to:

use a model to predict a quantity of anomalies associated with the given time period.

17. The apparatus as in claim 15, wherein the process when executed is further operable to:

group a second plurality of anomalies associated with a second time interval, wherein the second time interval partially overlaps the given time interval;

determine, for each of the second plurality of anomalies, a relevancy score; and report a selected one of the second plurality of anomalies anomaly to the user interface based on a comparison of the relevancy scores of the second plurality of anomalies.

18. The apparatus as in claim 13, wherein the apparatus determines the anomaly assessment rate by modeling a history of anomaly assessments received via the user interface.

19. The apparatus as in claim 13, wherein the process when executed is further operable to:

add the feedback to a training data set comprising a plurality of feedback regarding a plurality of anomalies reported to the user interface;

train a machine learning-based classifier using the training data set to determine a relevancy for a detected anomaly;

determine a relevancy for the particular anomaly; and report, via the anomaly reporting mechanism, the particular anomaly to the user interface based in part on the determined relevancy.

20. The apparatus as in claim 19, wherein the process when executed is further operable to:

provide the determined relevancy for the particular anomaly to the particular distributed learning agent that detected the particular anomaly, wherein the particular distributed learning agent is configured to use the provided relevancy to suppress anomaly notifications to the device based in part on the determined relevancy.

* * * * *

UNITED STATES PATENT AND TRADEMARK OFFICE

CERTIFICATE OF CORRECTION

PATENT NO. : 10,469,511 B2
APPLICATION NO. : 15/211093
DATED : November 5, 2019
INVENTOR(S) : Jean-Philippe Vasseur et al.

It is certified that error appears in the above-identified patent and that said Letters Patent is hereby corrected as shown below:

In the Specification

In Column 16, Line 2, please amend as shown:
simple regression approach. Assuming that $N_i(t)$ is the num- Signed and Sealed this
Thirtieth Day of June, 2020

Andrei Iancu
*Director of the United States Patent and Trademark Office*